Figures 1, 2, 3:
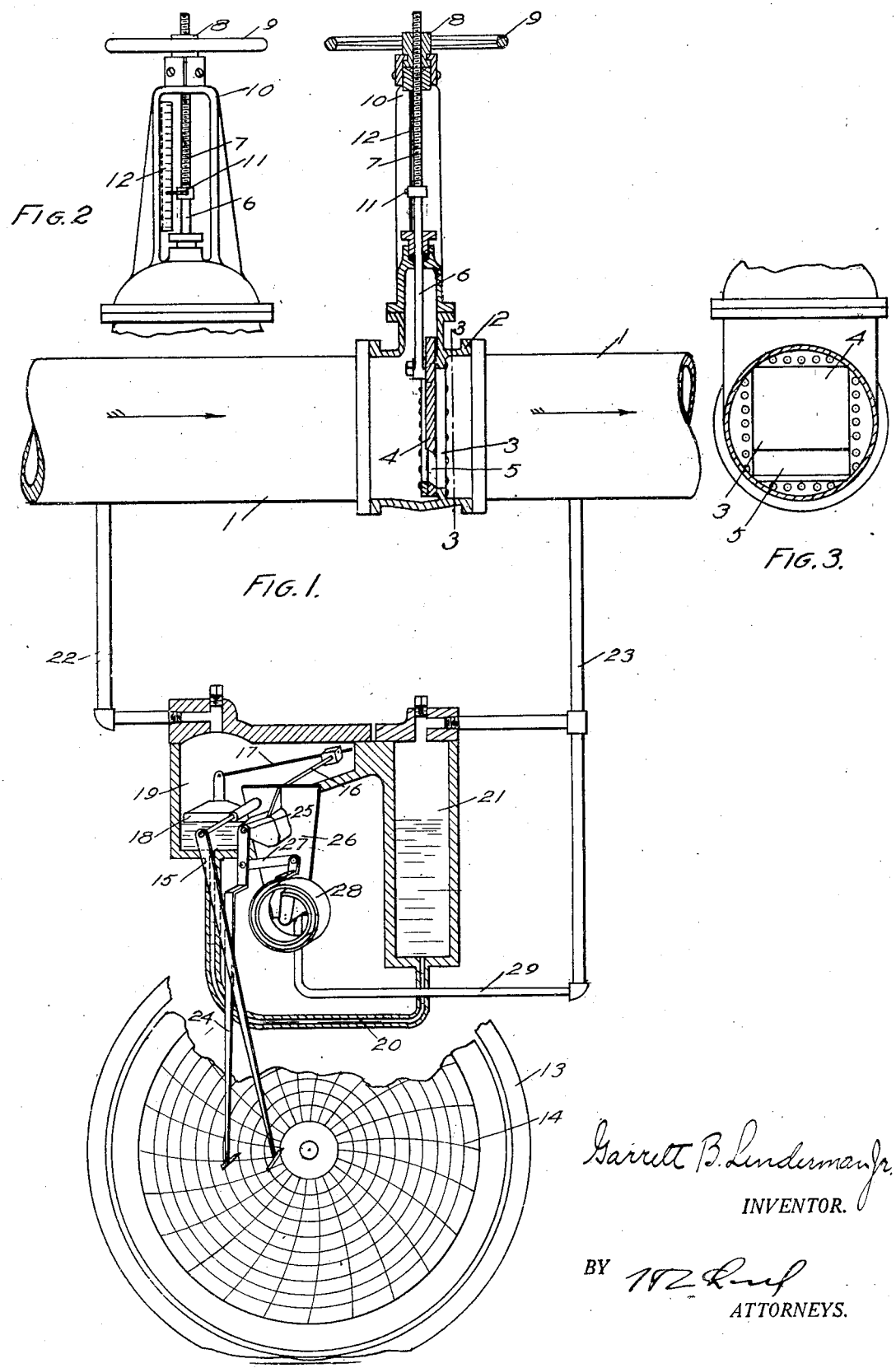

Aug. 29, 1933.  G. B. LINDERMAN, JR  1,924,125

ORIFICE METER

Filed Aug. 20, 1928

Garrett B. Linderman Jr.
INVENTOR.

BY
ATTORNEYS.

Patented Aug. 29, 1933

1,924,125

UNITED STATES PATENT OFFICE 1,924,125

ORIFICE METER

Garrett B. Linderman, Jr., Erie, Pa., assignor to American Meter Company, New York, N. Y., a Corporation of Delaware Application August 20, 1928. Serial No. 300,672

2 Claims. (Cl. 73—167)

In the use of orifice meters it is common to take the differential pressure, the line pressure, and the square root of the product of these pressures times what is termed the coefficient to arrive at the total flow through the meter. This method of calculation is very accurate within certain ranges but with a wide range of differential and line pressure there is a certain amount of error. If this change in line pressures, or conditions, which brings about this extreme change in differential is one of some frequency it may be corrected by changing the orifice but these fluctuations are in many installations simply temporary and do not warrant such changes in the orifice as this involves quite a large amount of effort. The present invention is designed to provide a convenient means by which the orifice may be readily shifted with extreme ranges of differential or line pressure and the proper coefficient indicated with such changes. Features and details of the invention will appear from the specification and claims.

A preferred embodiment of the invention is illustrated in the accompanying drawing as follows:—

Fig. 1 is an elevation of the orifice meter, partly in section.

Fig. 2 a front elevation of the valve operating mechanism for varying the orifice.

Fig. 3 a section on the line 3—3 in Fig. 1.

1 marks the conduit. Arranged in this conduit is a valve case 2 through which is arranged an orifice 3. A valve gate 4 operates over the orifice 3 and is adapted to vary the orifice, a meter orifice 5 being controlled by the adjustment of the gate. A stem 6 extends over the gate through the valve case. It is provided with a screw-threaded upper end 7 on which is arranged a nut 8. The nut is provided with a hand wheel 9 and is swiveled in a yoke 10 which extends from the valve case. A pointer 11 is formed on the stem 10 and operates over a scale 12.

The orifice 5 with different positions of the valve is calibrated and the scale 12 formed in conjunction therewith in such manner that it indicates the proper coefficient for each orifice adjustment, each graduation of the scale preferably corresponding with a designated coefficient.

A meter recording instrument 13 is provided with the usual chart 14 which is actuated from the instrument in the usual manner. A differential pen arm 15 is carried by a rock shaft 16. The rock shaft is actuated by a rock arm 17 from a float 18. The float 18 is arranged in a float chamber 19. The float chamber 19 is connected by a U-bend 20 with a chamber 21 completing the U-bend. The chamber 19 is connected by a pipe 22 with the up-stream side of the conduit and the chamber 21 is connected by a pipe 23 with the down-stream side of the conduit. The U-bend and chambers are supplied with mercury as usual and the differential pressure is recorded through the pen arm of the chart in the usual manner, the pen arm, therefore, responding to differences of pressure at opposite sides of the orifice. A line pressure pen arm 24 is pivoted at 25 on a bracket 26. It is connected by a link 27 with a Bourdon tube 28 and the tube is connected by a pipe 29 with the pipe 23 and thus with the line. The Bourdon tube, therefore, is responsive to line pressures and this is indicated and recorded on the chart by the pen arm 24 in the usual manner.

If the differential exceeds the range in which the coefficient for that orifice is accurate at the line pressure indicated the orifice may be changed bringing the differential within the range of accurate computation at the then existing line pressure and the proper coefficient is immediately indicated on the scale.

What I claim as new is:—

1. In an orifice meter, the combination of a conduit having an adjustable orifice therein; means for varying the size of the orifice; a scale connected with said last means for indicating the flow coefficient at different adjustments of the orifice; a recording means; a line pressure gauge indicating the same on the recording means; and a differential pressure gauge responsive to pressure differences at opposite sides of the orifice and indicating the same on the recording means.

2. In an orifice meter, the combination of a conduit having an orifice therein; a sliding gate on the orifice for adjusting the same; a stem extending from the gate; a scale adjacent to said stem and calibrated in coefficients at different adjustments of the orifice; means on said stem and cooperating with said scale to indicate the flow coefficient for each adjustment of the orifice; a recording means; a line pressure gauge indicating the same on the recording means; and a differential pressure gauge responsive to pressure differences at opposite sides of the orifice and indicating the same on the recording means.

GARRETT B. LINDERMAN, JR.